United States Patent
Giffard-Burley

(10) Patent No.: US 10,997,362 B2
(45) Date of Patent: May 4, 2021

(54) METHOD AND SYSTEM FOR INPUT AREAS IN DOCUMENTS FOR HANDWRITING DEVICES

(71) Applicant: Wacom Co., Ltd., Kazo (JP)

(72) Inventor: Joss Giffard-Burley, Frome (GB)

(73) Assignee: Wacom Co., Ltd., Kazo (JP)

( * ) Notice: Subject to any disclaimer, the term of this patent is extended or adjusted under 35 U.S.C. 154(b) by 0 days.

(21) Appl. No.: 15/344,156

(22) Filed: Nov. 4, 2016

(65) Prior Publication Data

US 2018/0060291 A1    Mar. 1, 2018

Related U.S. Application Data

(60) Provisional application No. 62/382,765, filed on Sep. 1, 2016.

(51) Int. Cl.
| | |
|---|---|
| *G06F 3/00* | (2006.01) |
| *G06F 40/174* | (2020.01) |
| *G06F 40/14* | (2020.01) |
| *G06F 3/0488* | (2013.01) |

(52) U.S. Cl.
CPC ........ *G06F 40/174* (2020.01); *G06F 3/04883* (2013.01); *G06F 40/14* (2020.01)

(58) Field of Classification Search
CPC ...... G06F 17/24; G06F 3/0488; G06F 40/174; G06F 40/14; G06F 3/04883
See application file for complete search history.

(56) References Cited

U.S. PATENT DOCUMENTS

| | | | | |
|---|---|---|---|---|
| 5,629,499 | A | * | 5/1997 | Flickinger ............. G06F 1/1626 178/18.01 |
| 5,838,819 | A | | 11/1998 | Ruedisueli et al. |
| 7,091,959 | B1 | * | 8/2006 | Clary .................. G06F 3/03545 345/173 |
| 7,564,995 | B1 | * | 7/2009 | Yaeger .................... G06F 3/038 382/119 |

(Continued)

OTHER PUBLICATIONS

Extended European Search Report dated Dec. 1, 2017, issued in corresponding EP Application No. 17187250.0, 9 pages.

(Continued)

*Primary Examiner* — Kyle R Stork
(74) *Attorney, Agent, or Firm* — Christensen O'Connor Johnson Kindness PLLC

(57) ABSTRACT

A server generates a form identifier to identify a page or input area of a document; generates a location and field type for the input area of the document; associates the location and field type with the form identifier; and reproduces a second document with a graphically represented identifier converted from the form identifier. The location, field type, and form identifier are stored in metadata of the document. A client device obtains a form identifier converted from the graphically represented identifier from a handwriting device. The form identifier is associated with the location and field type for the input area of the second document. The form identifier, location, and field type are stored in metadata of the second document. The client device obtains a positional signal of handwriting from the handwriting device and associates the positional signal with the input area based on the form identifier, location, and field type.

27 Claims, 15 Drawing Sheets

(56) References Cited

U.S. PATENT DOCUMENTS

| | | | | |
|---|---|---|---|---|
| 8,495,061 | B1* | 7/2013 | Lifantsev | G06F 17/30722 707/713 |
| 8,797,603 | B1* | 8/2014 | Dougherty | H04N 1/2166 358/1.15 |
| 8,885,951 | B1* | 11/2014 | Cristofano | G06K 9/00449 382/173 |
| 9,396,174 | B1* | 7/2016 | Alves | G06F 17/2247 |
| 9,535,913 | B2* | 1/2017 | Tecu | G06F 17/30076 |
| 2002/0088651 | A1 | 7/2002 | Carini et al. | |
| 2004/0044958 | A1* | 3/2004 | Wolf | G06F 17/218 715/255 |
| 2004/0070613 | A1* | 4/2004 | Sprague | G06F 17/3089 715/762 |
| 2006/0007189 | A1* | 1/2006 | Gaines, III | G06F 17/243 345/179 |
| 2006/0031764 | A1 | 2/2006 | Keyser et al. | |
| 2006/0092128 | A1* | 5/2006 | Gao | G06F 3/0237 345/156 |
| 2007/0168382 | A1* | 7/2007 | Tillberg | G06F 17/30253 |
| 2009/0138503 | A1* | 5/2009 | Chowdhury | G06F 17/30917 |
| 2010/0027834 | A1* | 2/2010 | Spitzig | G06K 9/00577 382/100 |
| 2011/0145701 | A1* | 6/2011 | Dejean | G06F 17/217 715/246 |
| 2012/0147420 | A1* | 6/2012 | Nishimi | G06F 3/1204 358/1.15 |
| 2012/0236368 | A1* | 9/2012 | Uchida | G06K 9/00442 358/3.28 |
| 2012/0331374 | A1* | 12/2012 | Fanning | G06F 17/3092 715/234 |
| 2013/0117660 | A1* | 5/2013 | Fischer | G06F 17/218 715/234 |
| 2013/0159396 | A1* | 6/2013 | Newman | H04L 67/42 709/203 |
| 2014/0122534 | A1* | 5/2014 | Cohen | G06F 17/30961 707/797 |
| 2014/0186816 | A1* | 7/2014 | Peterson | G09B 7/04 434/362 |
| 2014/0237342 | A1* | 8/2014 | King | G06F 17/243 715/224 |
| 2014/0298167 | A1* | 10/2014 | Jones | G06K 9/00483 715/251 |
| 2014/0324434 | A1* | 10/2014 | Vozila | G10L 15/18 704/257 |
| 2015/0082145 | A1* | 3/2015 | Ames | G06F 17/2247 715/234 |
| 2015/0100874 | A1* | 4/2015 | Pallakoff | G06F 17/241 715/232 |
| 2015/0248391 | A1* | 9/2015 | Watanabe | G06F 17/243 715/226 |
| 2015/0359395 | A1* | 12/2015 | Eide | A47L 5/30 15/391 |
| 2016/0055376 | A1* | 2/2016 | Koduru | G06K 9/00449 382/176 |
| 2016/0127599 | A1* | 5/2016 | Medicherla | H04N 1/2166 358/403 |
| 2016/0170695 | A1* | 6/2016 | Sakashita | G06F 3/1236 358/1.15 |
| 2016/0259766 | A1* | 9/2016 | Ivanov | G06F 16/5866 |
| 2017/0061809 | A1* | 3/2017 | St. Jacques, Jr. | G06Q 10/10 |
| 2017/0109349 | A1* | 4/2017 | Rosen | G06F 17/3012 |
| 2017/0185722 | A1* | 6/2017 | Vu | G06F 19/328 |

OTHER PUBLICATIONS

Gibbs, S., "Wacom Bamboo Spark Review: Pen and Paper With Digital Tricks," The Guardian, Apr. 8, 2016, <https://www.theguardian.com/technology/2016/apr/08/wacom-bamboo-spark-review-pen-paper-with-digital-tricks> [retrieved May 15, 2017], 6 pages.

"XMP Specification Part 3: Storage in Files," XMP™, Adobe Systems Incorporated, Jul. 2010, 80 pages.

* cited by examiner

Registration

Contact Details

| Name: | Christopher Lea | — 220 |
| Company Name: | Wacom Europe | — 221 |
| Date: | 15 July 2016 | — 222 |

☐ I would like to learn more about upcoming events.
*223*

Page 1 of 1

FIG. 2

Metadata: Document Level

```
<?xpacket begin="" id="XXX"?>
<rdf:RDF xmlns:rdf="XXX" xmlns:xmp="XXXXX" xmlns:wgss="XXX">
 <rdf:Description rdf:about="XXX">
  <wgss:PacketType wgss:level="document"/>
  <wgss:PageIDList>
   <rdf:Bag>
    <rdf:li>
     <wgss:PageID wgss:pdfPage="1" wgss:uuid="1234567"/>
    </rdf:li>
   </rdf:Bag>
  </wgss:PageIDList>
  <wgss:AuthoringTool wgss:version="1.0" wgss:toolName="inkdoc Paper"/>
  <wgss:DocumentCompletionTime>20XX-XX-XX</wgss:DocumentCompletionTime>
 </rdf:Description>
</rdf:RDF>
<?xpacket end="w"?>
```

`wgss:uuid="1234567"` → Page ID

Elements for document level

*FIG. 3A*

Metadata: Page Level

```
<?xpacket begin="" id="XXX"?>
<rdf:RDF xmlns:rdf="xxx" xmlns:wgss="xxx">
 <rdf:Description rdf:about="xxx">
  <wgss:PacketType wgss:level="page"/>
  <wgss:PageID wgss:pdfPage="1" wgss:uuid="1234567"/>       ← Page ID
  <wgss:FieldIDList>
   <rdf:Bag>
    <rdf:li>142532</rdf:li>
    <rdf:li>142533</rdf:li>
    <rdf:li>142534</rdf:li>    ← Field ID
    <rdf:li>142535</rdf:li>
   </rdf:Bag>
  </wgss:FieldIDList>
 </rdf:Description>
</rdf:RDF>                       ← Elements for page level
<?xpacket end="w"?>
```

*FIG. 3B*

Metadata: Field Level (Name: Signature)

```
<?xpacket begin="" id="XXX"?>
<rdf:RDF xmlns:rdf="xxx" xmlns:xmp="xxx" xmlns:wgss="xxx">
 <rdf:Description rdf:about="xxx">
  <wgss:PacketType wgss:level="field"/>
  <wgss:FieldUUID wgss:pdfID="102" wgss:fieldID="142532"/>     ← Field ID
  <wgss:FieldLocation wgss:x="186" wgss:y="536" wgss:w="175" wgss:h="27"/>
  <wgss:FieldType>Text</wgss:FieldType>                         ← Field Type
  <wgss:FieldTag>Name</wgss:FieldTag>
  <wgss:Required>True</wgss:Required>
  <wgss:FieldCompletionTime>20XX-XX-XX</wgss:FieldCompletionTime>
  <wgss:Data>Christopher Lea</wgss:Data>
  <wgss:PenData>                                                ← Elements for field level
   <rdf:Seq>
    <rdf:li rdf:parseType="Resource">
     <wgss:Stroke>
      <rdf:Seq>
       <rdf:li rdf:parseType="Resource">
        <wgss:Point wgss:x="10" wgss:y="13" wgss:w="53" wgss:inkColor="#FFFFFF"/>
       </rdf:li>
       <rdf:li rdf:parseType="Resource">
        <wgss:Point wgss:x="11" wgss:y="14" wgss:w="52"/>
       </rdf:li>
       <rdf:li rdf:parseType="Resource">
        <wgss:Point wgss:x="12" wgss:y="16" wgss:w="48"/>
       </rdf:li>
       <rdf:li rdf:parseType="Resource">
        <wgss:Point wgss:x="13" wgss:y="14" wgss:w="10"/>
       </rdf:li>
      </rdf:Seq>
     </wgss:Stroke>
    </rdf:li>                                                   ← Elements for stroke
   </rdf:Seq>
  </wgss:PenData>
 </rdf:Description>
</rdf:RDF>
<?xpacket end="w"?>
```

*FIG. 3C*

Metadata: Field Level (Company Name)

```
<?xpacket begin="" id="XXX"?>
<rdf:RDF xmlns:rdf="xxx" xmlns:xmp="xxx" xmlns:wgss="xxx">
 <rdf:Description rdf:about="xxx">
   <wgss:PacketType wgss:level="field"/>
   <wgss:FieldUUID wgss:pdfID="103" wgss:fieldID="142533"/>          ← Field ID
   <wgss:FieldLocation wgss:x="186" wgss:y="507" wgss:w="175" wgss:h="27"/>
   <wgss:FieldType>Text</wgss:FieldType>          ← Field Type
   <wgss:FieldTag>Company Name</wgss:FieldTag>
   <wgss:Required>True</wgss:Required>
   <wgss:FieldCompletionTime>20XX-XX-XX</wgss:FieldCompletionTime>
   <wgss:Data>Wacom Europe</wgss:Data>
   <wgss:PenData>                                    ← Elements for field level
    <rdf:Seq>
     <rdf:li rdf:parseType="Resource">
      <wgss:Stroke>
        <rdf:Seq>
         <rdf:li rdf:parseType="Resource">
           <wgss:Point wgss:x="10" wgss:y="13" wgss:w="53" wgss:inkColor="#FFFFFF"/>
         </rdf:li>
         <rdf:li rdf:parseType="Resource">
           <wgss:Point wgss:x="11" wgss:y="14" wgss:w="52"/>
         </rdf:li>
         <rdf:li rdf:parseType="Resource">
           <wgss:Point wgss:x="12" wgss:y="16" wgss:w="48"/>
         </rdf:li>
         <rdf:li rdf:parseType="Resource">
           <wgss:Point wgss:x="13" wgss:y="14" wgss:w="10"/>
         </rdf:li>
        </rdf:Seq>
      </wgss:Stroke>                                 ← Elements for stroke
     </rdf:li>
    </rdf:Seq>
   </wgss:PenData>
 </rdf:Description>
</rdf:RDF>
<?xpacket end="w"?>
```

*FIG. 3D*

Metadata: Field Level (Date)

```
<?xpacket begin="" id="XXX"?>
<rdf:RDF xmlns:rdf="xxx" xmlns:xmp="xxx" xmlns:wgss="xxx">
 <rdf:Description rdf:about="xxx">
  <wgss:PacketType wgss:level="field"/>
  <wgss:FieldUUID wgss:pdfID="104" wgss:fieldID="142534"/>         ← Field ID
  <wgss:FieldLocation wgss:x="186" wgss:y="479" wgss:w="175" wgss:h="27"/>
  <wgss:FieldType>Text</wgss:FieldType>         ← Field Type
  <wgss:FieldTag>Date</wgss:FieldTag>
  <wgss:Required>True</wgss:Required>
  <wgss:FieldCompletionTime>20XX-XX-XX</wgss:FieldCompletionTime>
  <wgss:Data>XX XXXX 20</wgss:Data>
  <wgss:PenData>                                 ← Elements for field level
   <rdf:Seq>
    <rdf:li rdf:parseType="Resource">
     <wgss:Stroke>
      <rdf:Seq>
       <rdf:li rdf:parseType="Resource">
        <wgss:Point wgss:x="10" wgss:y="13" wgss:w="53" wgss:inkColor="#FFFFFF"/>
       </rdf:li>
       <rdf:li rdf:parseType="Resource">
        <wgss:Point wgss:x="11" wgss:y="14" wgss:w="52"/>
       </rdf:li>
       <rdf:li rdf:parseType="Resource">
        <wgss:Point wgss:x="12" wgss:y="16" wgss:w="48"/>
       </rdf:li>
       <rdf:li rdf:parseType="Resource">
        <wgss:Point wgss:x="13" wgss:y="14" wgss:w="10"/>
       </rdf:li>
      </rdf:Seq>
     </wgss:Stroke>                              ← Elements for stroke
    </rdf:li>
   </rdf:Seq>
  </wgss:PenData>
 </rdf:Description>
</rdf:RDF>
<?xpacket end="w"?>
```

*FIG. 3E*

Metadata: Field Level (Checkbox)

```
<?xpacket begin="" id="XXX"?>
<rdf:RDF xmlns:rdf="xxx" xmlns:xmp="xxx" xmlns:wgss="xxx">
<rdf:Description rdf:about="xxx">
<wgss:FieldUUID wgss:pdfID="104" wgss:fieldID="142535"/>         ← Field ID
<wgss:FieldLocation wgss:x="186" wgss:y="450" wgss:w="10" wgss:h="10"/>
<wgss:FieldTag>Checkbox_1</wgss:FieldTag>
<wgss:FieldType>Boolean</wgss:FieldType>      ← Field Type
<wgss:Required>True</wgss:Required>
</rdf:Description>                             ← Elements for field level
</rdf:RDF>
<?xpacket end="w"?>
```

*FIG. 3F*

METHOD AND SYSTEM FOR INPUT AREAS IN DOCUMENTS FOR HANDWRITING DEVICES

CROSS-REFERENCE TO RELATED APPLICATION

This application claims the benefit of Provisional Application No. 62/382,765, filed Sep. 1, 2016, which is expressly incorporated herein by reference in its entirety.

BACKGROUND

Electronic handwriting is increasingly important and popular in a variety of contexts, such as electronic signatures for documents. Many devices can be used for electronic handwriting. One technique that is gaining in popularity is using an electronic stylus to add handwriting to an electronic document. For example, a user may view a document on a tablet device while writing with the electronic stylus, thereby allowing the user to accurately place handwriting in the electronic document, such as by signing the user's name on a signature line. Yet, writing in ink on paper also remains important in many contexts. In one possible scenario, an electronic stylus with an ink cartridge can be used to generate electronic handwriting data while also applying ink to paper. Although electronic handwriting can be captured during this type of writing process, a typical electronic handwriting device has no ability to process or interpret the handwriting data intelligently with respect to a specific document that is being signed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a computer-implemented method comprises generating a form identifier to identify a page or an input area of a first document; generating a location and a field type for the input area of the first document; associating the location and the field type with the form identifier, wherein the location, the field type, and the form identifier are stored in a metadata stream of the first document; and reproducing a second document from the first document with a graphically represented identifier converted from the form identifier. The first document may include a plurality of input areas, and the plurality of input areas may comprise multiple types of input areas. The multiple types of input areas may include a signature area. The form identifier and the location and the field type may be stored in the metadata stream of the first document in a structured document format. The structured document format may include a root element and a plurality of sub-elements that are nested within the root element. The form identifier, the location, and the field type may be stored in the sub-elements. The form identifier may be stored in an attribute property of one of the sub-elements. The structured document format may be an XML format. The metadata stream of the document may be in a metadata format that is independent of file format of the document. The metadata format may be an XMP format. The graphically represented identifier may be selected from the group consisting of a barcode, a dot code, and a QR code.

The method may further include generating dimensions for the input area of the first document.

In another aspect, a computer-implemented method executed by a computer that is electrically connected with a handwriting device comprises obtaining a form identifier converted from a graphically represented identifier of a document from the handwriting device, wherein the form identifier is associated with a location and a field type for an input area of the document, and wherein the form identifier, the location, and the field type are stored in a metadata stream of the document; obtaining a positional signal of handwriting from the handwriting device; and associating the positional signal of the handwriting with the input area based on the form identifier, the location, and the field type. The method may include converting the handwriting into a data type based at least in part on the field type for the input area. The handwriting may include pen coordinate data. The handwriting also may include biometric data. The metadata may be stored in the metadata stream in an XMP format. The metadata stream of the document may include dimensions for the input area of the document. The positional signal may include a series of point locations. Associating the positional signal of the handwriting with the input area may include determining whether the point locations are within the input area. Associating the positional signal of the handwriting with the input area also may include determining whether the point locations are within a bleed margin of the input area. Associating the positional signal of the handwriting with the input area also may include determining whether a first down point of a stroke is within the input area.

In another aspect, a system includes a computing device programmed to generate a form identifier to identify a page or an input area of a first document; generate a location and a field type for the input area of the first document; associate the location and the field type with the form identifier, wherein the location, the field type, and the form identifier are stored in a metadata stream of the first document; and reproduce a second document from the first document with a graphically represented identifier converted from the form identifier. The system also includes a handwriting device and a client computing device programmed to obtain a form identifier converted from the graphically represented identifier of the second document from the handwriting device, wherein the form identifier is associated with the location and the field type for the input area of the second document, and wherein the form identifier, the location, and the field type are stored in a metadata stream of the second document; obtain a positional signal of handwriting from the handwriting device; and associate the positional signal of the handwriting with the input area based on the form identifier, the location, and the field type.

A computing device may be programmed to perform any of the techniques described above or elsewhere herein. A computer-readable medium may have stored thereon executable instructions configured to cause a computing device to perform any of the techniques described above or elsewhere herein.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 2 is a diagram of an illustrative user-specific form showing handwriting input areas;

FIGS. 3A-3F are code diagrams that depict illustrative metadata in XMP packets that may be included in a metadata section of the document illustrated in FIG. 2;

DETAILED DESCRIPTION

Figure 1A:
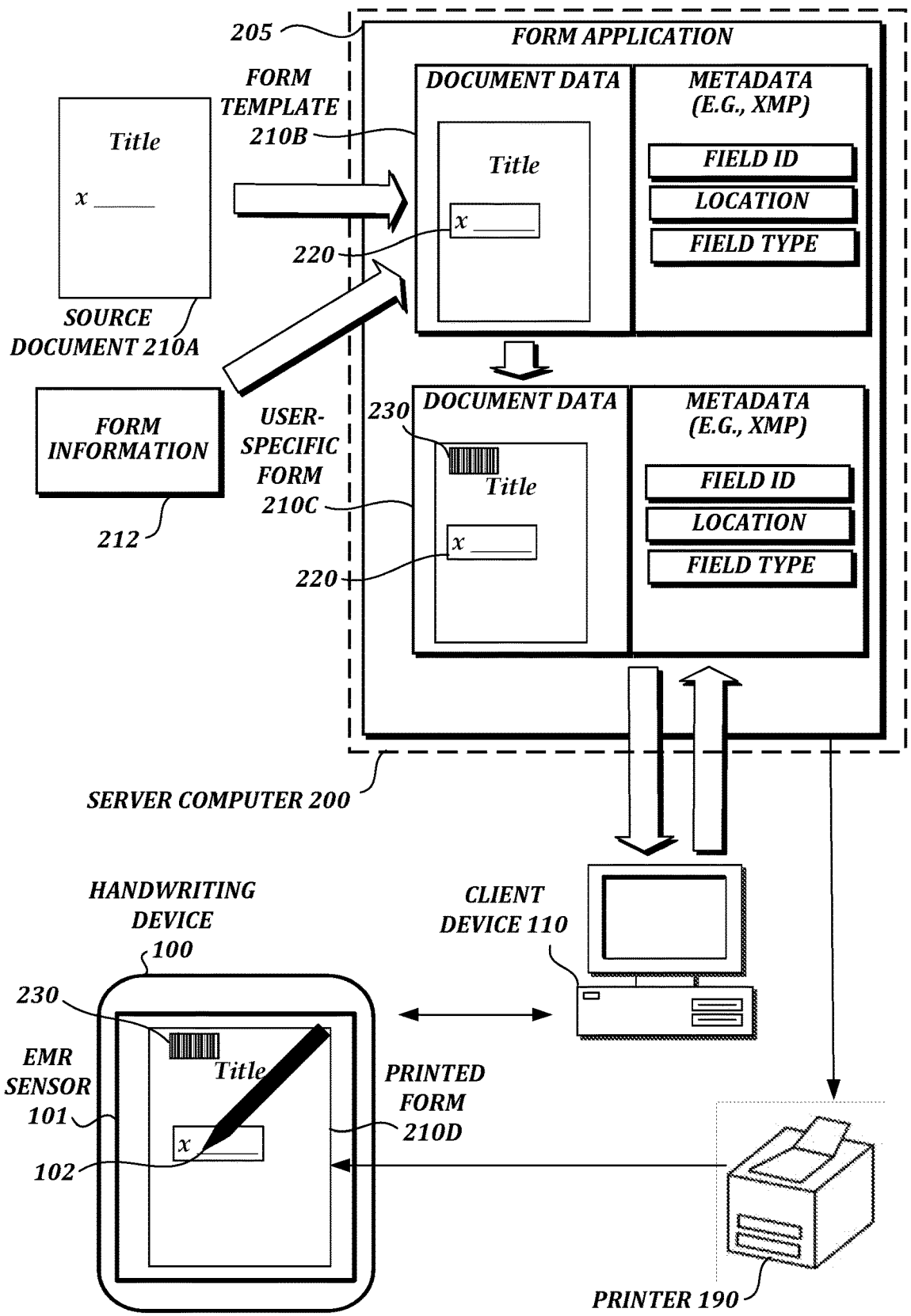
FIGS. 1A-1D are block diagrams of illustrative systems and devices in which described embodiments may be implemented.

In embodiments described herein, input areas of a document are defined (e.g., in terms of location, dimensions, and type) in metadata within the document. Specific items of metadata that may be used in described embodiments include tags, text, identifiers (IDs), and Boolean values. The metadata provides the ability to store data describing behavior and features of the input areas within the document file itself. Embodiments described herein are particularly useful for handwriting input. When input (such as handwriting input) is applied to a document, the input data (e.g., captured stroke data corresponding to handwriting input) can be stored within the document along with other metadata. Input applied to a particular input area can be associated with the input area. The workflow in described embodiments can be conceived as involving two stages: form creation, which includes defining input areas, and data capture, which includes receiving and processing input, such as handwriting input received from a handwriting device and a graphically represented ID on a paper, in a corresponding document.

In one embodiment, a disclosed file format is used in combination with a handwriting device, such as a smart folio or tablet device, and an associated pen device. The pen device is designed for writing in ink on paper while also generating corresponding electronic handwriting data during the writing process that can be mapped to particular input areas in the document. For example, a client application running on a client device in communication with the handwriting device can embed electronic handwriting data in electronic documents as ink handwriting is applied to corresponding paper documents, and can associate the electronic handwriting data with an input area.

As used herein, the term "handwriting device" refers to a hybrid device that captures handwriting input digitally using a stylus pen while the user writes with the pen on paper. Handwriting devices may be implemented as dedicated handwriting collection devices, such as handwriting pad devices or handwriting tablet devices. Handwriting devices are not necessarily strictly input devices, and may include other functionality (e.g., data transmission functionality, etc.). Further details on illustrative handwriting devices are provided below.

Described embodiments allow automatic creation of electronic documents that include classes of data that are not available from paper documents or scanned images of paper documents, such as biometric data (e.g., pen pressure data, timing/velocity of strokes) and pen position data. Such data can be used for signature authentication, automatic character recognition or shape recognition, or other interpretation of handwriting (such as identifying marks in checkboxes) in particular input areas, or for other purposes. Described embodiments can avoid time-consuming intervening steps such as optical character recognition or human inspection of handwritten forms, though such steps could optionally be used to supplement or cross-check results of automatic techniques. Electronic versions of the paper documents can then be stored locally or transmitted to another device for storage or further processing, such as in a cloud computing arrangement. In addition to storing handwriting data as metadata, described systems and devices also can store an image of the signed document or images of particular handwriting along with the document.

Illustrative Systems and Devices

FIG. 1A is a block diagram of an illustrative system in which described embodiments may be implemented. In the example shown in FIG. 1A, a handwriting device 100 communicates with a client device 110 (e.g., via USB, Bluetooth, or other suitable connection). The client device 110 also communicates with a server computer 200 running a form application 205. (Server computer 200 and client device 110 are described in further detail below with reference to FIG. 1B.) Although FIG. 1A shows a single server computer, client device, and handwriting device for ease of illustration, it should be understood, in the context of this example and other examples described herein, that one or more additional handwriting devices, client devices, and server computers may be present. In such scenarios, many arrangements and topologies are possible. For example, a client device may communicate with more than one handwriting device and a server computer may communicate with more than one client device. A client device can be a desktop or notebook computer, a smartphone, a tablet device, or some other computing device.

In the illustrative scenario depicted in FIG. 1A, a form application 205 running on the server computer 200 generates a form from a source document 210A (e.g., a document in a PDF format or other electronic document format) and form information 212 provided as input to the form application 205. The form information 212 indicates information (e.g., position, dimensions, name, type) associated with input areas (e.g., handwriting input areas) for the form. The source document 210A provides document data for the form, and may also include basic metadata for the form such as creation time/date, author, etc. The document data may include text, graphics, formatting information, and other information that represents the content of the document when it is displayed or printed.

In the illustrative scenario depicted in FIG. 1A, the form application 205 generates a form template 210B, from which individual documents (e.g., a user-specific form 210C) can be generated. The form template 210B includes a document data section and a metadata section. The metadata section includes additional information for the document. The form application 205 uses the form information 212 to identify and define an input area 220 (e.g., a handwriting input area) in the form template 210B. The form application 205 associates the input area 220 with metadata in the metadata section of the form template 210B. In this example, the input area 220 is associated with a field ID, a location, and a field type. Other metadata that may be included in the form template 210B (e.g., a document ID, page IDs, creation time/date, author, etc.) is not shown for ease of illustration.

In the illustrative scenario depicted in FIG. 1A, the form application 205 generates a user-specific form 210C based on the form template 210B and other information specific to a particular user (e.g., a hospital patient filling in an admission form, a bank customer signing an agreement) that will be adding handwriting to the form. In doing so, the form application 205 generates a graphically represented ID 230 (e.g., barcode, dot code, QR code) to be included in the user-specific form 210C. The graphically represented ID 230 can be read and decoded (e.g., by a suitably configured scanner or camera device 241 arranged on a handwriting device 100) to obtain information about the document for subsequent processing. The user-specific form 210C also includes metadata from the form template, including the field ID, location, and field type associated with the input area 220. The server computer 200 transmits the user-specific form 210C to the client device 110, which transmits the user-specific form 210C in electronic form to the handwriting device 100.

In one embodiment, the form application 205 generates the graphically represented ID 230 by converting one or more IDs stored in the metadata section of the document into a corresponding code. The IDs to be converted may include IDs associated with the document itself (e.g., document ID, page ID, field ID), IDs associated with a user, or some combination of IDs. At the client side, the graphically represented ID 230 can be decoded to obtain the information that was used to generate the graphically represented ID 230. Information obtained in this way can then be used to map handwriting data to particular input areas in the document. If the position signals of the handwriting data match with the defined input areas, the client device can associate the handwriting data with those input areas and store the handwriting data and the association in the metadata section of the electronic document.

For example, a numeric code of the form [DocID] [PageID] can be converted into a barcode and added to a document to be signed by a user. When the barcode is read and decoded by a scanner 241 (e.g., prior to a user signing the document), the document ID and page ID can be used by the client device 110 to look up the corresponding electronic document and page and identify defined input areas on that page. To accomplish this, the code is sufficiently unique such that the appropriate document and location can be accurately identified. The level of uniqueness can be varied based on factors such as the overall number of documents and pages that are expected to be handled in a particular implementation. Universally unique identifiers (UUIDs) may be preferred in some circumstances but are not required for this purpose.

In the illustrative scenario depicted in FIG. 1A, the handwriting device 100 is a smart folio or smart clipboard device designed for use with a pen device 102 capable of generating electronic handwriting data as well as writing in ink (which may be stored in a replaceable ink cartridge) on paper. Therefore, in this example, the server computer 200 transmits printing information for the user-specific form 210C to a printer 190 that produces a printed form 210D (including the graphically represented ID 230).

Referring again to FIG. 1A, the handwriting device 100 may include one or more visual or mechanical guides (not shown) to aid in placing the paper in an appropriate location on the handwriting device 100, and may also include a clip 240 to hold and maintain the position of the paper 210D on the handwriting device 100 during the writing process, and a scanner 241 to scan the graphically represented ID 230 printed on the paper 210D. With the paper 210D being positioned and held in an expected location, the handwriting device 100 is able to provide handwriting position data to the client device 110 such that it can be accurately mapped to a corresponding position in the electronic document.

Handwriting data received by the client device 110 from the handwriting device 100 typically includes pen event data (e.g., coordinate data and pressure data) and may also include other data, such as an image of a signature, biometric data, etc. One or more sensor modules that generate sensor data may be included in the handwriting device 100 or, in some cases, in other devices, such as the pen 102. The sensor data can be translated into pen event data, such as position/coordinate data and pressure data.

In this example, the handwriting device 100 and pen device 102 use electromagnetic resonance (EMR) technology to generate handwriting data, but the handwriting device 100 can be a capacitive stylus or other type of stylus. An EMR sensor 101 in the handwriting device 100 is implemented as a digitizer that incorporates a sensor board that detects the pen's movement, and energy is induced in the pen's resonant circuit by a magnetic field generated by the sensor board surface. The pen's resonant circuit then makes use of this energy to return a magnetic signal to the sensor board surface. The board detects the pen's coordinate position at regular time intervals even if the electronic pen does not touch the sensor board surface, so long as the pen remains within close enough proximity to the sensor board, such that signals can still be received from the pen. (The effective signal range can vary depending on the particular technology being used, but is generally on the order of several millimeters.)

Alternatively, other handwriting input technology can be used. For example, an electronic pen may use other wireless technology or may be connected by a wire to a digitizer. As another example, an electronic pen may or may not be detectable away from the surface of a digitizer. As another example, an electronic pen may be powered or unpowered. Powered pens may receive power via a wire connected to an external power source or via an on-board battery. As another example, it is possible to input handwriting data without an electronic pen (e.g., via a stylus on a pressure sensitive digital writing pad, a touchscreen, or some other input device that does not require an electronic pen).

However the handwriting data may be collected, handwriting data provided by signature devices may include pen event information, device information, and/or contextual information about the context in which the handwriting was made. Pen event information may include the x/y position of the pen-tip on or above the digitizer surface and the time since the start of the handwriting. In addition to x/y-coordinate values, pen event information may optionally include additional information subject to the capabilities of the signature device, such as pressure (pen force), angles (azimuth, altitude, and/or rotation) and pen-down status. Pen event information is typically collected at regular intervals during a signing process. The sampling rates at which pen event information may be collected may vary depending on system design and configuration.

Handwriting data can be stored in a raw or compressed format. Handwriting data, document data, or metadata may encrypted or unencrypted, depending on factors such as desired levels of security or sensitivity of particular applications.

Figure 1B:
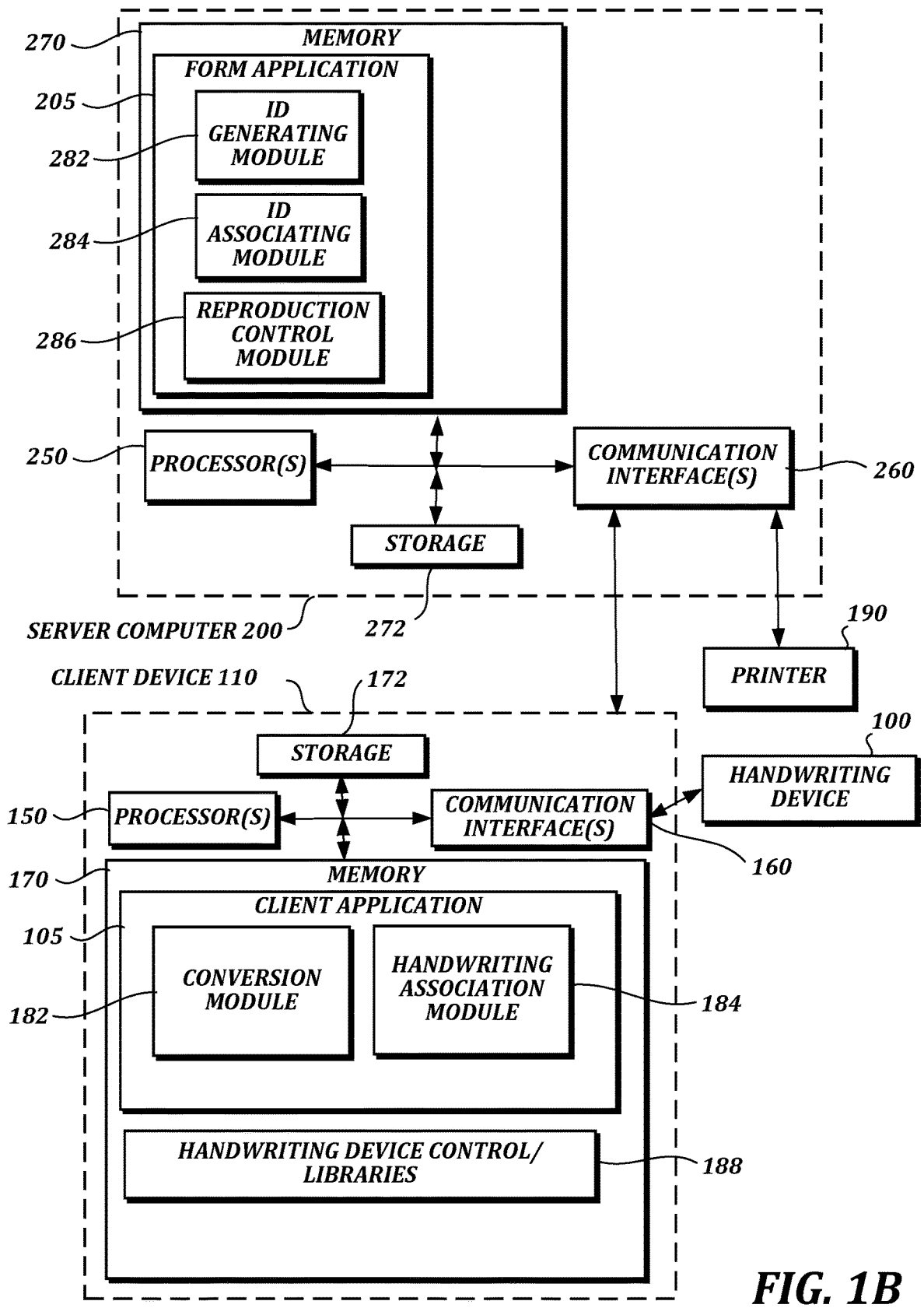

FIG. 1B is a block diagram depicting an illustrative server computer 200 and client device 110 in more detail. In the example shown in FIG. 1B, the server computer 200 includes one or more processors 250, one or more communication interfaces 260, and memory 270. The form application 205 is loaded into memory 270 from storage 272 and includes an ID generating module 282, an ID associating module 284, and a document reproduction control module 286.

In this example, the ID generating module 282 is the section of the form application 205 responsible for generating information such as field IDs, page IDs, and field types to be stored in the metadata section of document templates and user-specific forms. The ID associating module 284 is the section of the form application 205 responsible for associating information such as field IDs, page IDs, and field types with document features such as input areas. The document reproduction control module 286 is the section of the form application 205 responsible for reproducing documents (e.g., from a form template) in the form of user-specific forms or printed forms. The server computer 200 can transmit user-specific forms and printing information to other devices (such as the client device 110 and the printer 190, respectively) via the communication interface 260.

In the example shown in FIG. 1B, the client device 110 includes one or more processors 150, one or more communication interfaces 160, and memory 170. A client application 105 is loaded into memory 170 from storage 172 and includes a conversion module 182 and a handwriting association module 184. For handwriting device control and related data processing, the client device 110 also may include handwriting device control software and related libraries 188 (e.g., signature SDK libraries).

Figure 1C:
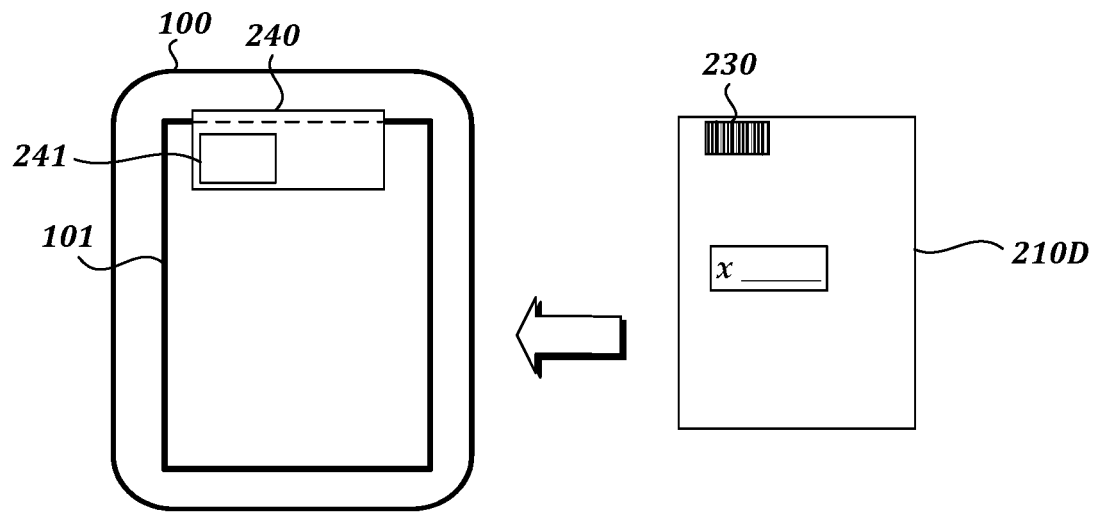

FIG. 1C depicts an illustrative handwriting device 100 and its use in a described embodiment. In the example shown in FIG. 1C, the handwriting device 100 includes an EMR sensor 101, a clip 240, and a scanner 241. The clip 240 is arranged near the writing surface on the handwriting device 100 to hold a paper 210D in place on the writing surface. Referring again to FIG. 1A, in an illustrative scenario the paper 210D is reproduced from a first document in the server computer 200, and is printed out by a printer 190. The server computer 200 adds a graphically represented ID 230 to a second document when the server computer 200 reproduces the first document. The graphically represented ID 230 is associated with a field ID, a location, and a field type.

Figure 1D:
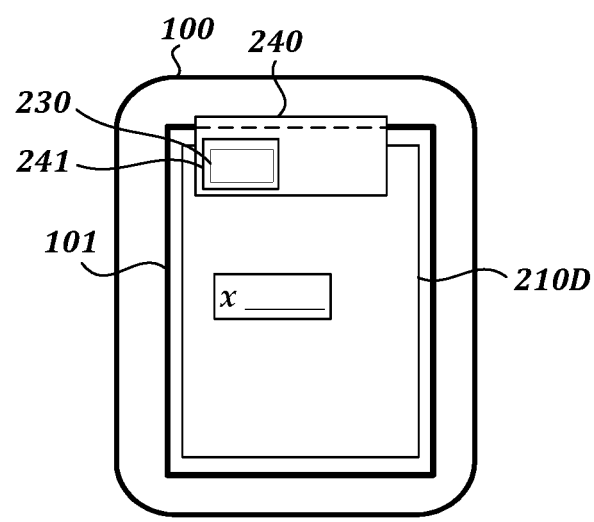

Turning again to FIG. 1C, the scanner 241 arranged on the handwriting device 100 is configured to scan the graphically represented ID 230 in order to identify, among other potential characteristics, the format of the original document. In the example shown in FIG. 1C, the scanner 241 is included in the clip 240 and positioned to read the graphically represented ID 230 printed on the side of the paper 210D to be signed. Alternatively, such as where the graphically represented ID 230 may be printed on the reverse side of the paper 210D, the scanner 241 can be positioned in the main body of the handwriting device 100 (e.g., below the clip 240). FIG. 1D depicts the paper 210D held in place by the clip 240, with the graphically represented ID 230 located such that it can be scanned by the scanner 241. Having the paper 210D positioned in a known location and orientation allows handwriting input to be accurately applied to the paper such that handwriting input can be associated with the appropriate input area.

Illustrative Forms and Metadata

FIG. 2 is a diagram of an illustrative user-specific form showing handwriting input areas. In the example shown in FIG. 2, text input areas 220-222 and a checkbox input area 223 are defined. Various techniques can be used to assist a user in filling the appropriate input areas in the form. For example, active input areas can be highlighted with a distinctive background color, border, or the like. If certain fields are required to be filled, those fields can be color coded, marked with an asterisk, or distinguished in some other way from fields that are not required. Similarly, fields that have not been filled can be visually distinguished from fields that have been filled.

Disclosed embodiments can be used with any document file formats that allow inclusion of metadata, such as PDF documents or DOCX documents. For example, if the document is a PDF document, an input area within the document can be provided with a matching AcroForm object within the PDF file. In at least one embodiment, Extensible Metadata Platform (XMP) packets are used for storing metadata. The XMP model is an extension of a Resource Description Framework (RDF) in Extensible Markup Language (XML). XMP metadata is serialized into XML for storage in files in XMP packets, and is independent of any particular document file format. (See "XMP Specification Part 3: Storage in Files" (July 2010), available from Adobe Systems Inc.) In an illustrative scenario, an XMP packet can be embedded in a metadata stream (e.g., of a matching Adobe® Acrobat® form (or AcroForm) object in a PDF document) to store data describing behavior and features of the input area. An XMP packet embedded in the metadata stream for the PDF page object can be used to describe or permit generation of features such as a barcode for each individual page. An XMP packet embedded in the metadata stream of the root PDF object can store metadata related to the document as a whole, along with other data related to specific portions of the document, such as specific pages or input areas.

FIGS. 3A-3F depict illustrative metadata in XMP packets that may be included in a metadata section of the document illustrated in FIG. 2. For example, the XMP packets may be included in a metadata stream of a PDF document. (To simplify the presentation of the metadata in these figures, some values have been abbreviated or replaced with placeholder values such as XXX.)

In the example shown in FIG. 3A, document-level metadata elements are contained in an XMP packet, including a page ID ("1234567") for the single page in the document. In the example shown in FIG. 3B, page-level metadata elements are contained in an XMP packet, including a list of field IDs (e.g., "142532") for the page identified in FIG. 3A. In the examples shown in FIGS. 3C-3F, field-level metadata elements are contained in respective XMP packets for each identified input area 220-223 in FIG. 2 and corresponding field ID listed in FIG. 3B. The field-level metadata elements may include FieldType (e.g., Text, Number, Freehand, Signature, Boolean), FieldTag (e.g., a user-configurable tag such as "Company Name"), FieldLocation (e.g., x- and y-coordinates and width and height dimensions), Required (indicating whether filling this input area is required for this form), Data, and PenData (stroke data). The value of the Data field depends on the FieldType. For example, if Field-Type is "Text" the Data field may reflect the result of applying a handwriting recognition algorithm to the handwriting input. As another example, if Field Type is "Signature" the Data field may include encoded pen position data, biometric data, etc., in an encrypted or unencrypted form, along with other information such the signatory's name, reason for signing, or a public key for encryption.

In these examples, FIG. 3C depicts metadata for the "Name" box (FieldType=Text) ("220" in FIG. 2), FIG. 3D depicts metadata for the "Company Name" box (FieldType=Text) ("221" in FIG. 2), FIG. 3E depicts metadata for the "Date" box (FieldType=Text) ("222" in FIG. 2), and FIG. 3F depicts metadata for the checkbox (FieldType=Boolean) ("223" in FIG. 2). FIGS. 3C, 3D, and 3E also depict corresponding stroke data, as these input areas have been filled in FIG. 2. (For ease of presentation, the pen data is abbreviated to a single stroke in FIGS. 3C, 3D, and 3E. In practice, a line of printed characters such as those shown in the "Name" or "Company Name" box would consist of a much larger number of strokes.) FIG. 3F lacks stroke data, as the checkbox 223 is empty in FIG. 2. Though not shown in FIG. 3F, the checkbox metadata may include a default data value (e.g., "False") to reflect the assumption that if no stroke data is detected in this input area, the user has not checked the box.

Illustrative Processes and Workflows

This section provides details of illustrative processes for generating documents with input areas for handwriting input using described file formats, associating handwriting input with input areas in such documents, and related workflows.

Figure 4:
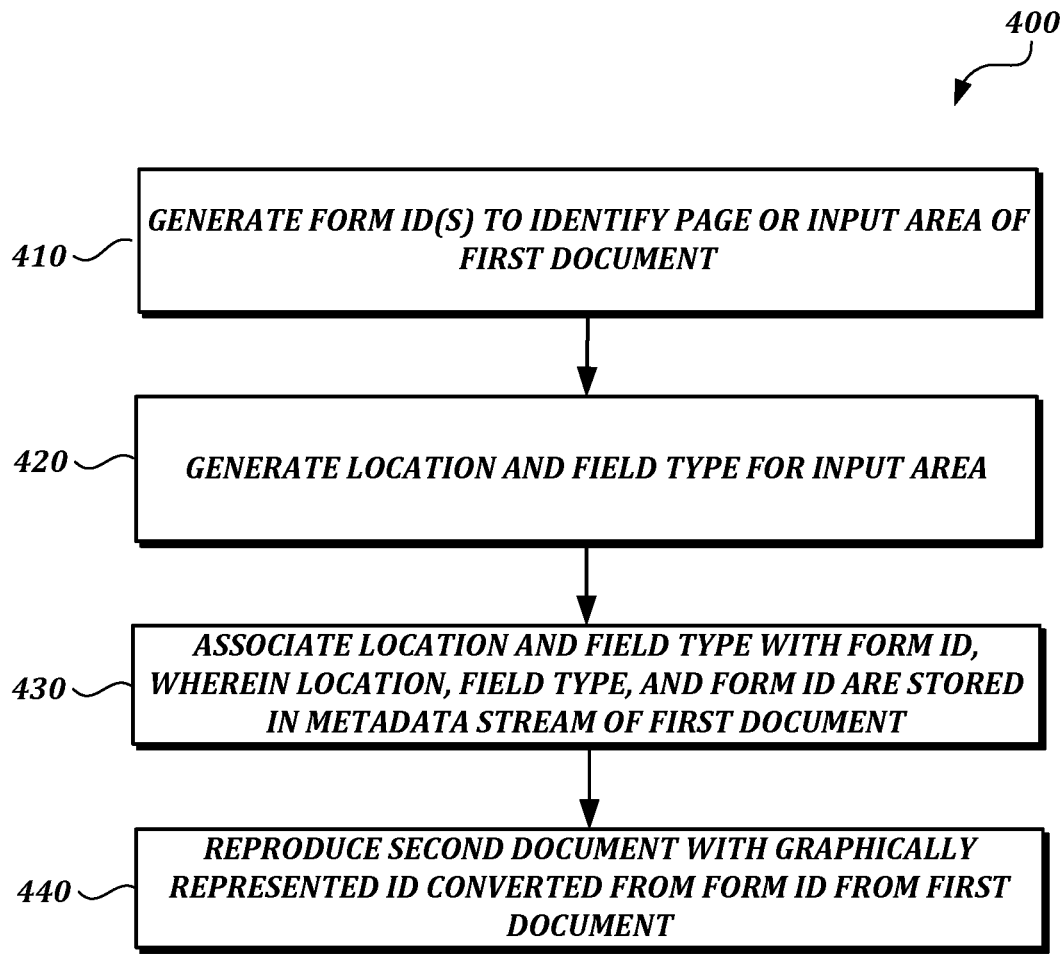
FIG. 4 is a flow diagram of an illustrative process in which a server computer generates metadata to be stored in a first document and reproduces a second document with a graphically represented ID converted from metadata in the first document.

FIG. 4 is a flow diagram of an illustrative process 400 in which a server computer (e.g., the server computer 200) generates metadata to be stored in a first document when a new PDF file is created or obtained and reproduces a second document with a graphically represented ID, such as a barcode, converted from metadata in the first document. The second document can be used for printing a paper version with the graphically represented ID. In the example shown in FIG. 4, at step 410 the server computer generates a form ID (e.g., a page ID or a field ID) that identifies a page or input area of a first document. At step 420, the server computer generates a location and a field type for the input area. At step 430, the server computer associates the location and field type with the form ID, and stores the location, field type, and form ID in a metadata stream of the first document. At step 440, the server computer reproduces a second document with a graphically represented ID converted from the form ID of the first document. Referring again to FIG. 1A, the second document may be printed out by a printer 190 as a paper that may be put onto the handwriting device 100, to be filled in by a user.

Figure 5:
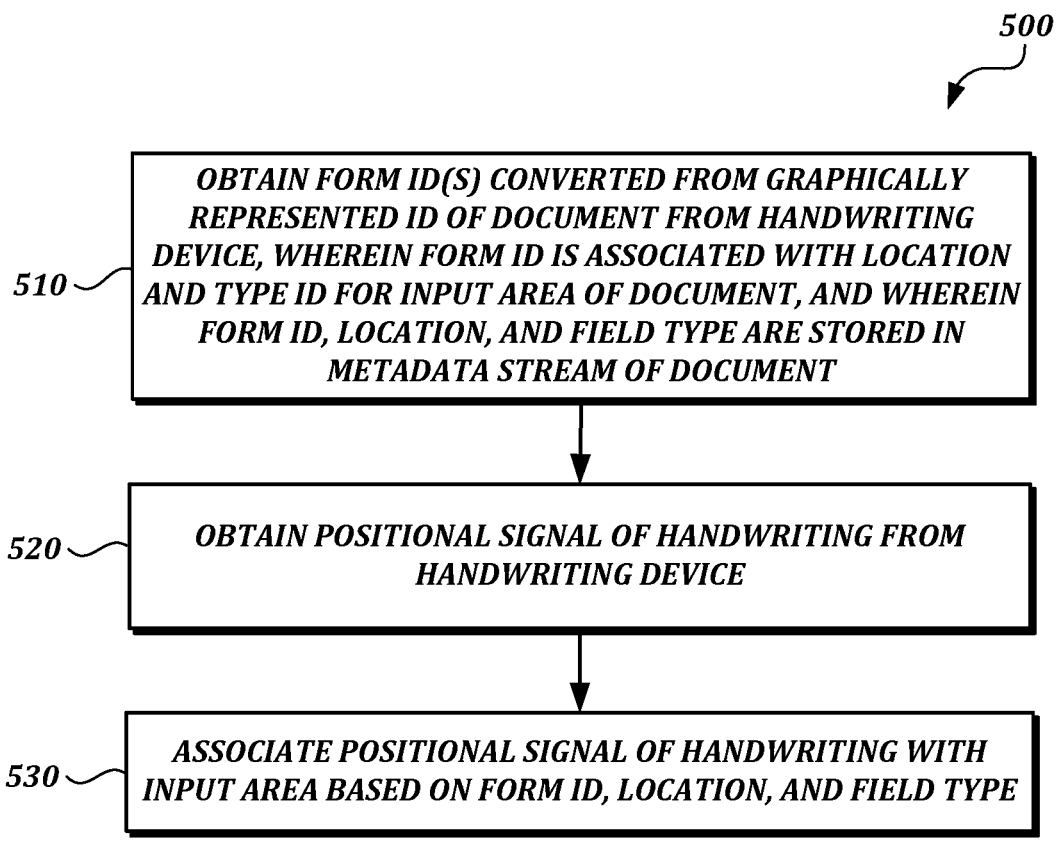
FIG. 5 is a flow diagram of an illustrative process in which a client device associates a positional signal of handwriting with an input area in a document based on metadata elements associated with the document.

FIG. 5 is a flow diagram of an illustrative process 500 in which a client device (e.g., the client device 110) associates a positional signal of handwriting with an input area in a document based on metadata elements associated with the document. In the example shown in FIG. 5, at step 510 the client device obtains a form ID (e.g., a page ID or a field ID) from the handwriting device 100. In at least one embodiment, the form ID is obtained from a graphically represented ID, which is scanned by a scanner of a handwriting device (e.g., the scanner 241 of the handwriting device 100). The form ID is associated with a location and field type for an input area of the document, and thus the client device can identify the format of the original document (first document) by using the obtained form ID. The form ID, location, and field type are stored in a metadata stream of the document. At step 520, the client computing device obtains a positional signal of handwriting from the handwriting device. At step 530, the client computing device associates the positional signal of handwriting with an input area based on the form ID, location, and field type.

An example of additional workflow that may be performed in accordance with one or more embodiments will now be described. In this example, the client device 110 sends a request to a server computer 200 in order to obtain the original PDF file corresponding to the first document. The server computer 200 identifies the original PDF file corresponding to the form ID sent from the client device 110 and sends the original PDF file to the client device 110. The client device 110 obtains the original PDF file and overlays the positional signal of handwriting onto the original PDF file. In addition, the client device 110 adds new metadata containing a location and a field type for the input area of the second document in the metadata stream of the original PDF file. The client device 110 shows on a display the overlay of handwriting and original form of the PDF file (first document), and the user can check whether or not the handwriting was written properly before sending the document to the server computer 200. Since the client device 110 adds the metadata, including handwriting data, in the metadata stream of the original PDF file as well as overlaying the handwriting on the original PDF file, the handwriting data can be put onto the server computer 200 automatically. This may help to reduce the need for manual input by the user of information corresponding to the handwriting data. More preferably, the client device 110 can convert the positional signal of handwriting according to a location and a field type for the input area corresponding to the original document which has the same form ID. The invention is not limited to this embodiment, however; for example, the server computer 200, instead of the client device 110, may convert the positional signal of handwriting according to a location and a field type for the input area corresponding to the original document which has the same form ID.

Figure 6:
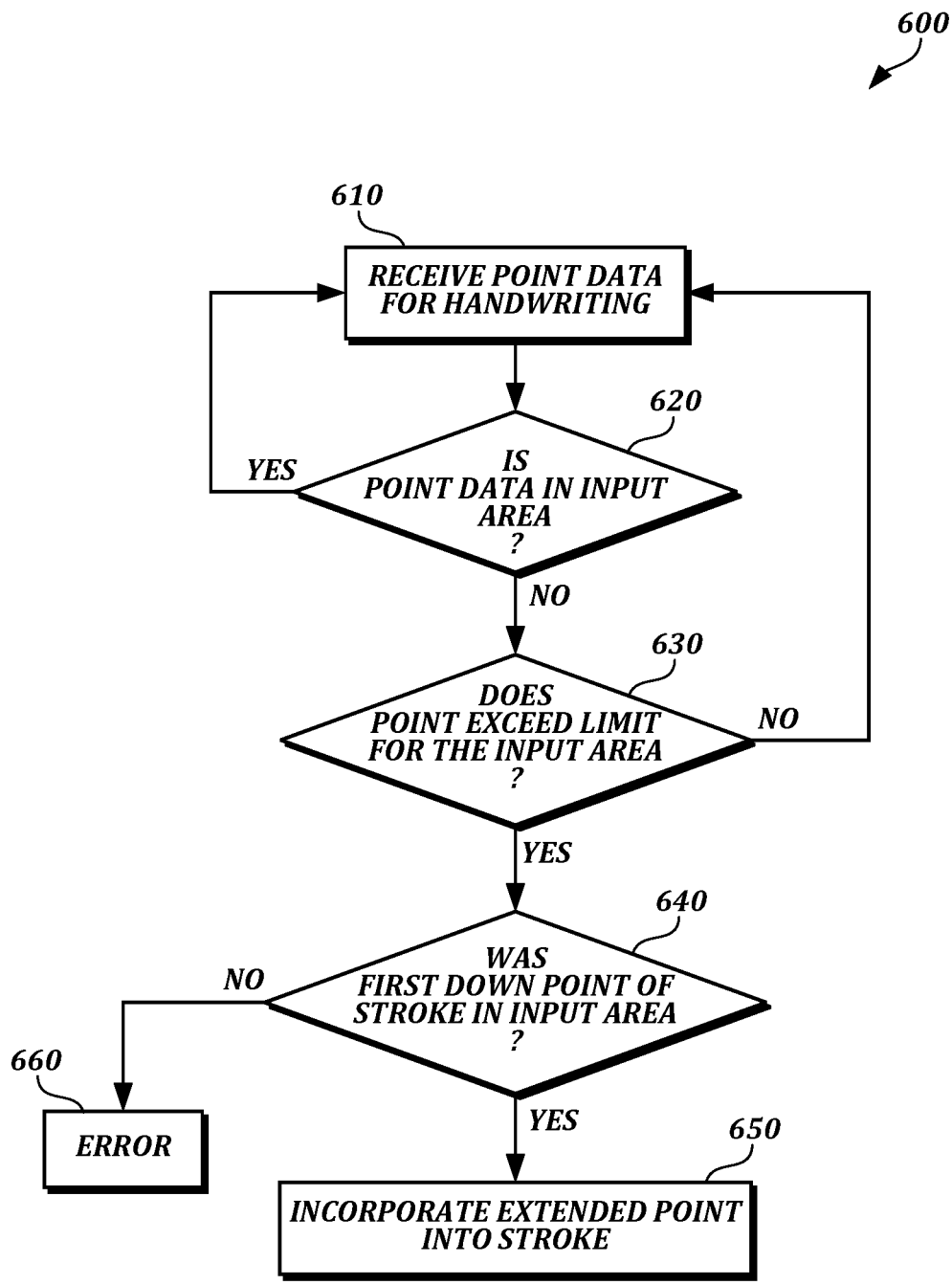
FIG. 6 is a flow diagram of an illustrative process to determine whether point data in a positional signal (pen data) is to be associated with an input area.

FIG. 6 is a flow diagram of an illustrative process 600 to determine whether point data in a positional signal (pen data) is to be associated with an input area. In this example, the input area has a margin (or bleed area) that is considered to be part of the input area. At step 610, a computing device (e.g., client device 110) receives point data for handwriting. At step 620, the computing device determines whether the point data is in the input area. If it is, the next point is processed. If it is not, the computing device makes a further determination at step 630 as to whether the point exceeds the margin for the input area. If it does not, the next point is processed. If it does, the computing device makes a further determination at step 640 as to whether the first down point (e.g., with pressure value greater than 0) of the stroke was within the input area. If it was, the point is incorporated into the stroke associated with the input area at step 650. If it was not, the process returns an error at step 660.

If an error is returned due to pen data being outside of an input area, this pen data can still be preserved in metadata, even if it is not associated with an input area. Such pen data can be analyzed later to determine the intent of the signer. This may be helpful, for example, where paper moves during signing, or where users write in unexpected areas of a document.

Figure 7A:
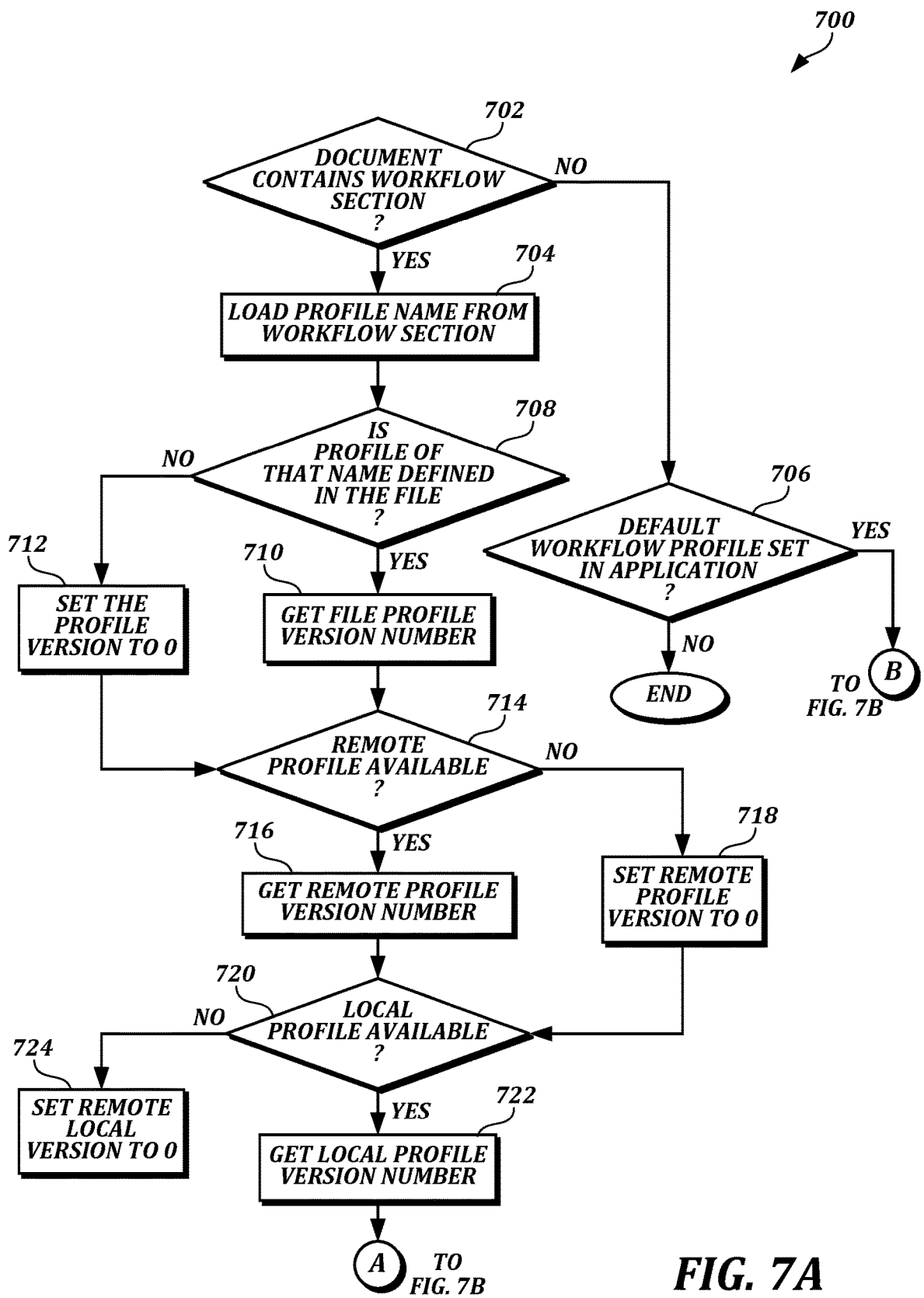
FIGS. 7A and 7B are flow diagrams that describe a workflow process involving profiles for processing of electronic documents described herein.
Figure 7B:
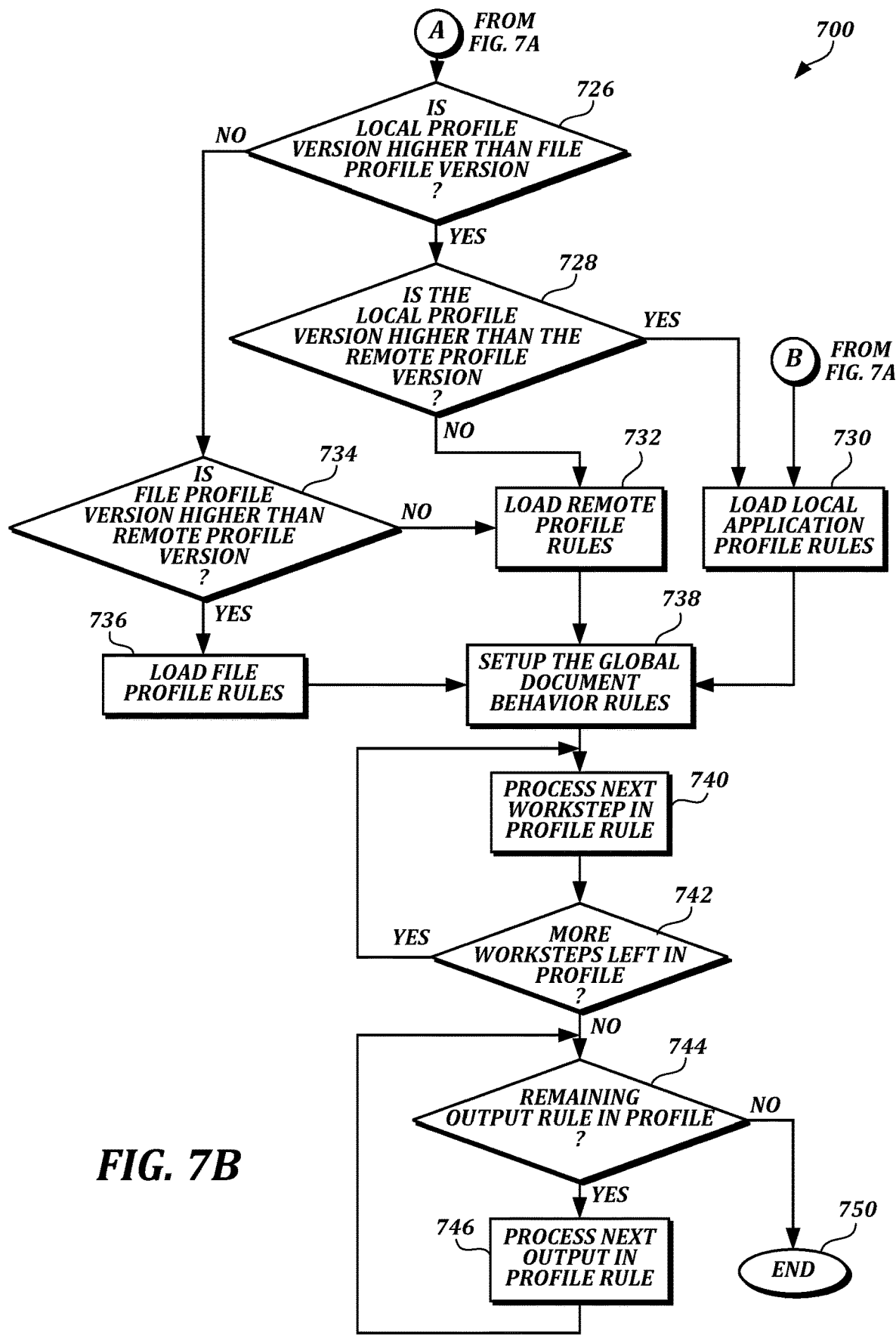

FIGS. 7A-7B describe a further workflow process 700 that can be used in combination with embodiments described herein. The workflow process 700 mainly deals with how software should load a workstep profile for a document if the document workflow step options are enabled. In this illustrative example, a workstep profile is a workflow that the client or server performs when a document arrives into its domain (e.g., when the file is pushed to the client). In an illustrative scenario, the workflow can be used when a document needs to be signed by User 1, and then emailed to User 2 for countersigning before being uploaded to a website.

In one embodiment, a pre-completion section of the workflow deals with issues to be conveyed before the document is processed; an example of this would be an option that the client should browse to the next active area immediately when the document is received. The pre-completion section also contains details of the current step within the workflow that is the active step in the case of a document that has multiple stages. The pre-completion section also includes the details on the criteria that the document should meet for the current workflow step to be completed (e.g., Field ID xxxx and Field ID yyyy must be completed, after which the post-completion rule for the current workflow step can be executed).

The post-completion section deals with what happens to the document after the current workflow step is considered completed. This may be, for example, saving the document with a particular specified name format, and outputting the document (e.g., file upload, e-mail, or some other mechanism). The post-completion processing by the client software will also increment the current work step number in the work flow rule to indicate the state the document is currently in.

These workflow profiles can be stored as an extension within the document level of the file format. However, it is also possible for client software to support the concept of a profile, such as a default profile or a named profile, rather than having the workflow explicitly defined within every file. This allows the flexibility for documents without workflows to have a workflow applied, or for documents with existing, but out of date workflow definitions to be updated without having to edit the original document.

Thus, there are several options for defining a workflow in a document:
  Explicitly within document level metadata (e.g., XMP).
  As a named profile in the metadata that is loaded from the client cache.
  As a remote profile in the metadata that is downloaded to a client dynamically and applied.
  Client software also can configure a default profile from its local cache or remotely to apply to documents that do not have a profile.

In this illustrative context, the example depicted in FIGS. 7A and 7B can now be described. Turning first to FIG. 7A, at step 702, a computing device determines whether a document contains a workflow section. If it does, a profile name is loaded at step 704. If it does not, a check for a default profile is made at step 706. If the profile name is loaded at step 704, a check is made at step 708 is made whether a profile of that name is in the file. If it is, the profile version number is obtained at step 710. If it is not, the profile version is set to 0 at step 712. At step 714, a check for a remote profile is performed. If a remote profile is available, the version number is obtained at step 716. If no remote profile is available, the remote profile version is set to 0 at step 718. At step 720, a check for a local profile is performed. If a local profile is available, the version number is obtained at step 722. If no local profile is available, the local profile version is set to 0 at step 724.

Turning now to FIG. 7B, if the local profile version is higher than the file profile version (step 726), a further check is performed to determine whether the local profile version is higher than the remote profile version at step 728. If it is, the local application profile rules are loaded at step 730. If not, the remote profile rules are loaded at step 732. If the local profile version is not higher than the file profile version, a further check is performed to determine whether the file profile version is higher than the remote profile version at step 734. If is not, the process returns to step 732. If it is, file profile rules are loaded at step 736.

When the selected profile rules are loaded, global document behavior is set up at step 738. A workstep is processed in the profile rule at step 740. If more worksteps remain (step 742), the next workstep is processed. If not, the process proceeds to output rules at step 744. If any output rules remain, the next output rule is processed at step 746. If not, the process ends at step 750.

Computing Environment

Embodiments described herein can be implemented by suitably programmed and configured computing devices, individually or in combination. The description below is applicable to computing devices such as servers, personal computers, mobile phones, smart phones, tablet computers, embedded computing devices, handwriting devices, and other currently available or yet to be developed devices that may be used in accordance with embodiments of the present disclosure.

In its most basic configuration, a computing device includes at least one processor and a system memory connected by a communication bus. Depending on the exact configuration and type of device, the system memory may be volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to and/or currently being operated on by the processor. In this regard, the processor may serve as a computational center of the computing device by supporting the execution of instructions.

The computing device may include a network interface comprising one or more components for communicating with other devices over a network. Embodiments of the present disclosure may access basic services that utilize a network interface to perform communications using common network protocols. The network interface may also include a wireless network interface configured to communicate via one or more wireless communication protocols, such as WiFi, 2G, 3G, 4G, LTE, WiMAX, Bluetooth, and/or the like.

The computing device also may include a storage medium. However, services may be accessed using a computing device that does not include means for persisting data to a local storage medium. Therefore, the storage medium is optional. In any event, the storage medium may be volatile or nonvolatile, removable or non-removable, implemented using any technology capable of storing information such as, but not limited to, a hard drive, solid state drive, CD-ROM, DVD, or other disk storage, magnetic tape, magnetic disk storage, and/or the like.

As used herein, the term "computer readable medium" includes volatile and nonvolatile and removable and non-removable media implemented in any method or technology capable of storing information, such as computer readable instructions, data structures, program modules, or other data. In this regard, system memory and storage media are examples of computer readable media.

For ease of illustration and because it is not important for an understanding of the claimed subject matter, the figures do not show some of the typical components of many computing devices. In this regard, a computing device may include input devices, such as a keyboard, keypad, mouse, trackball, microphone, video camera, touchpad, touchscreen, stylus, and/or the like. Such input devices may be coupled to the computing device by wired or wireless connections including RF, infrared, serial, parallel, Bluetooth, USB, or other suitable connection protocols using wireless or physical connections.

In any of the described examples, data can be captured by input devices (e.g., signature devices) and transmitted or stored for future processing. The processing may include encoding data, which can be subsequently decoded for presentation by output devices. Input devices can be separate from and communicatively coupled to a computing device, or can be integral components of the computing device. The computing device may also include output devices such as a display or touchscreen. The output devices can be separate from and communicatively coupled to the computing device, or can be integral components of the computing device. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™ PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

Extensions and Alternatives

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure.

The embodiments of the invention in which an exclusive property or privilege is claimed are defined as follows:

1. A computer-implemented method executed by a computer, the method comprising:
   generating a form identifier to identify a page or a handwriting input area of a first electronic document;
   generating a location and a field type for the handwriting input area of the first electronic document;
   associating the location and the field type with the form identifier, wherein the location, the field type, and the form identifier are stored in a metadata stream of the first electronic document in a structured document format;
   reproducing a second electronic document from the first electronic document with a graphically represented identifier converted from the form identifier, wherein the second electronic document includes the handwriting input area;
   obtaining a positional signal of handwriting on a paper document placed on a handwriting device from the handwriting device, wherein the positional signal comprises a series of point locations of a stroke; and
   associating the positional signal of the handwriting on the paper document with the handwriting input area of the second electronic document based on the form identifier, the location, and the field type, wherein associating the positional signal of the handwriting on the paper document with the handwriting input area of the second electronic document comprises:
     determining that a first portion of the stroke is within the handwriting input area of the second electronic document and that a second portion of the stroke is outside the handwriting input area of the second electronic document; and
     based on the determining, associating each point location in the stroke with the handwriting input area of the second electronic document.

2. The method of claim 1, wherein the first electronic document comprises a plurality of handwriting input areas, the plurality of handwriting input areas comprising multiple types of handwriting input areas.

3. The method of claim 2, wherein the multiple types of handwriting input areas comprise a signature area.

4. The method of claim 1, wherein the structured document format comprises a root element and a plurality of sub-elements which are nested within the root element, wherein the form identifier, the location, and the field type are stored in the sub-elements.

5. The method of claim 4, wherein the form identifier is stored in an attribute property of one of the sub-elements.

6. The method of claim 1, wherein the structured document format comprises an XML format.

7. The method of claim 6, wherein the metadata stream of the first electronic document is in a metadata format that is independent of file format of the first electronic document.

8. The method of claim 7, wherein the metadata format is an XMP format.

9. The method of claim 1, wherein the graphically represented identifier is selected from the group consisting of a barcode, a dot code, and a QR code.

10. The method of claim 1, further comprising generating dimensions for the handwriting input area of the first electronic document.

11. The method of claim 1, wherein associating each point location in the stroke with the handwriting input area of the second electronic document is further based on a determination that a first pen-down point of the stroke is within the handwriting input area of the second electronic document.

12. A non-transitory computer-readable storage medium having stored therein computer-readable instructions, including instructions configured to cause a computer system comprising at least one computing device to:

generate a form identifier to identify a page or a handwriting input area of a first electronic document;

generate a location and a field type for the handwriting input area of the first electronic document;

associate the location and the field type with the form identifier, wherein the location, the field type, and the form identifier are stored in a metadata stream of the first electronic document;

reproduce a second electronic document from the first electronic document with a graphically represented identifier converted from the form identifier, wherein the second electronic document includes the handwriting input area;

obtain a positional signal of handwriting on a paper document placed on a handwriting device from the handwriting device, wherein the positional signal comprises a series of point locations of a stroke; and associate the positional signal of the handwriting on the paper document with the handwriting input area of the second electronic document based on the form identifier, the location, and the field type, wherein associating the positional signal of the handwriting on the paper document with the handwriting input area of the second electronic document comprises:

determining that a first portion of the stroke is within the handwriting input area of the second electronic document and that a second portion of the stroke is outside the handwriting input area of the second electronic document; and based on the determining, associating each point location in the stroke with the handwriting input area of the second electronic document.

13. The non-transitory computer-readable storage medium of claim 12, wherein the computer system comprises a server computer.

14. A computer-implemented method executed by a computer which is electrically connected with a handwriting device, the method comprising:

obtaining a form identifier converted from a graphically represented identifier from the handwriting device, wherein the form identifier is associated with a location and a field type for a handwriting input area of an electronic document, wherein the form identifier, the location, and the field type are stored in a metadata stream of the electronic document;

obtaining a positional signal of handwriting on a paper document placed on a handwriting device from the handwriting device, wherein the positional signal comprises a series of point locations of a stroke; and associating the positional signal of the handwriting on the paper document with the handwriting input area of the electronic document based on the form identifier, the location, and the field type, wherein associating the positional signal of the handwriting on the paper document with the handwriting input area of the electronic document comprises:

determining that a first portion of the stroke is within the handwriting input area of the electronic document and that a second portion of the stroke is outside the handwriting input area of the electronic document; and based on the determining, associating each point location in the stroke with the handwriting input area of the electronic document.

15. The method of claim 14 further comprising converting the handwriting into a data type based at least in part on the field type for the handwriting input area of the electronic document.

16. The method of claim 14, wherein the handwriting comprises pen coordinate data.

17. The method of claim 16, wherein the handwriting further comprises biometric data.

18. The method of claim 14, wherein metadata is stored in the metadata stream in an XMP format.

19. The method of claim 14, wherein the metadata stream of the electronic document further includes dimensions for the handwriting input area of the electronic document.

20. The method of claim 14, wherein the second portion of the stroke outside the handwriting input area of the second electronic document is within a bleed margin of the handwriting input area.

21. The method of claim 14, wherein the first portion of the stroke within the handwriting input area of the second electronic document comprises a first down point of the stroke.

22. The method of claim 14 further comprising inserting the series of point locations in the metadata stream.

23. The method of claim 22, wherein the inserting is performed based on the field type, and wherein the field type is Signature.

24. The method of claim 14, wherein the handwriting device further comprises a clip configured to hold the paper document and a scanner configured to scan a printed version of the graphically represented identifier on the paper document, and wherein the obtained positional signal of the handwriting on the paper document is based at least in part on an expected position of the paper document when the paper document is held by the clip.

25. A non-transitory computer-readable storage medium having stored therein computer-readable instructions, including instructions configured to cause a computing device to:

obtain a form identifier converted from a graphically represented identifier from the handwriting device, wherein the form identifier is associated with a location and a field type for a handwriting input area of an electronic document, wherein the form identifier, the location, and the field type are stored in a metadata stream of the electronic document;

obtain a positional signal of handwriting on a paper document placed on the handwriting device from the handwriting device, wherein the positional signal comprises a series of point locations of a stroke; and associate the positional signal of the handwriting on the paper document with the handwriting input area of the electronic document based on the form identifier, the location, and the field type, wherein associating the positional signal of the handwriting on the paper document with the handwriting input area of the electronic document comprises:

determining that a first portion of the stroke is within the handwriting input area of the electronic document and that a second portion of the stroke is outside the handwriting input area of the electronic document; and based on the determining, associating each point location in the stroke with the handwriting input area of the electronic document.

26. The non-transitory computer-readable storage medium of claim 25, wherein the computing device is a client computing device.

27. A system comprising:

a computing device programmed to perform steps comprising:

generate a form identifier to identify a page or a handwriting input area of a first electronic document;

generate a location and a field type for the handwriting input area of the first electronic document;

associate the location and the field type with the form identifier, wherein the location, the field type, and the form identifier are stored in a metadata stream of the first electronic document; and reproduce a second electronic document from the first electronic document with a graphically represented identifier converted from the form identifier, wherein the second electronic document includes the handwriting input area; and a handwriting device; and a client computing device programmed to perform steps comprising:

obtain a form identifier converted from the graphically represented identifier of the second electronic document from the handwriting device, wherein the form identifier is associated with the location and the field type for the handwriting input area of the second electronic document, wherein the form identifier, the location, and the field type are stored in a metadata stream of the second electronic document;

obtain a positional signal of handwriting on a paper document placed on the handwriting device from the handwriting device, wherein the positional signal comprises a series of point locations of a stroke; and associate the positional signal of the handwriting on the paper document with the handwriting input area of the second electronic document based on the form identifier, the location, and the field type, wherein associating the positional signal of the handwriting on the paper document with the handwriting input area of the second electronic document comprises:

determining a first portion of the stroke is within the handwriting input area of the second electronic document and that a second portion of the stroke is outside the handwriting input area of the second electronic document; and based on the determining, associating each point location in the stroke with the handwriting input area of the second electronic document.

\* \* \* \* \*